T. E. MURRAY.
METHOD OF MAKING A PLURALITY OF LIKE TUBULAR OBJECTS.
APPLICATION FILED JAN. 15, 1919.

1,350,829.

Patented Aug. 24, 1920.

Inventor
Thomas E. Murray
By his Attorney

UNITED STATES PATENT OFFICE.

THOMAS E. MURRAY, OF NEW YORK, N. Y.

METHOD OF MAKING A PLURALITY OF LIKE TUBULAR OBJECTS.

1,350,829.

Specification of Letters Patent.

Patented Aug. 24, 1920.

Application filed January 15, 1919. Serial No. 271,326.

*To all whom it may concern:*

Be it known that I, THOMAS E. MURRAY, a citizen of the United States, residing at New York, in the county of New York and State of New York, have invented a certain new and useful Improvement in Methods of Making a Plurality of like Tubular Objects, of which the following is a specification.

The invention is a method of producing a plurality of tubular objects of sheet metal and of predetermined configuration—each of said objects being formed of two longitudinal half sections, and all of the sections forming the said objects being united simultaneously by continuous joints produced by a single electrical welding operation. The object is to cheapen and simplify the manufacture.

Figure 1:
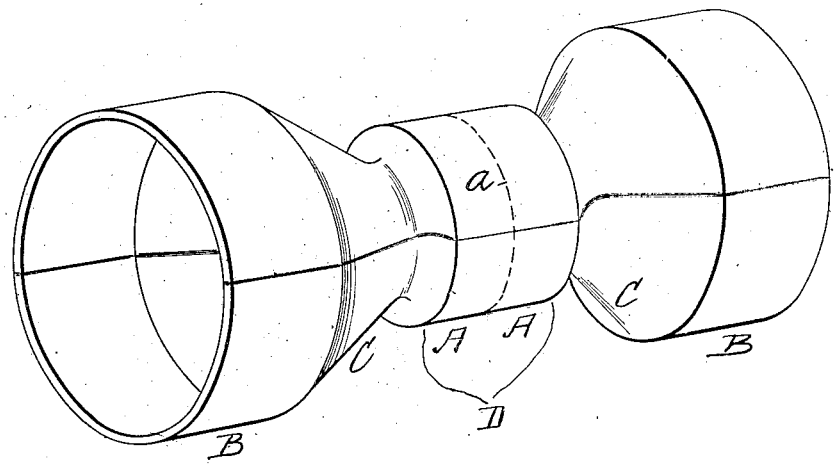
Figure 2:
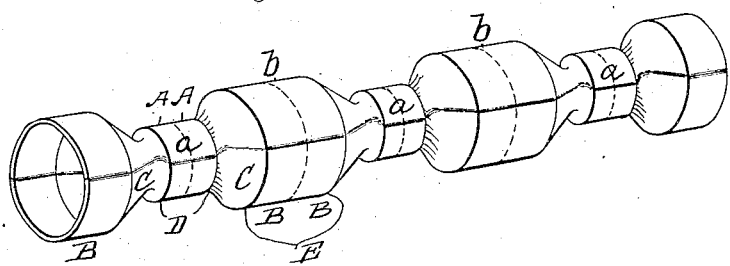

In the accompanying drawings I illustrate my method as applied to the manufacture of the tubular shells of vehicle hubs. Figure 1 is a perspective view of two of said hubs before separation. Fig. 2 is a similar view of six of said hubs, also before separation.

Similar letters of reference indicate like parts.

In Fig. 1 each hub shell unit consists of the cylindrical portion A, the cylindrical portion B of larger diameter than portion A and the intermediate tapered portion C uniting said cylindrical portions. To produce two such unit shells, I make by stamping or striking up the sheet metal, two precisely similar longitudinal half sections, each having a semi-cylindrical portion D of twice the desired width of each cylindrical portion A, and semi-cylindrical portions B, B and A, A united by tapered portions C, C. These sections I place in registering contact at their edges, as shown in Fig. 1, and electrically weld said edge surfaces together at a single welding operation. I then divide the cylindrical portions A, A by a transverse cut, as indicated by dotted line *a* in Fig. 1—thus separating the two precisely similar units.

Where more than two hub shells are to be made, two longitudinal half sections are produced as before, but alternating with the semi-cylindrical portions D are the semi-cylindrical portions E of greater diameter than portions D—each portion E being of twice the width of the semi-cylindrical portion B. These two sections being placed in registering contact at their edges, as shown in Fig. 2, said edge surfaces are electrically welded together at a single welding operation. I then divide the cylindrical portions A, A by transverse cuts, as indicated by the dotted line *a, a, a*, Fig. 2, and the cylindrical portions B, B, as indicated by dotted lines *b, b*, and I thus produce six hub shell units all precisely alike.

I claim:

The method of making a plurality of like tubular objects, each having at one end a cylinder and at the opposite end a cylinder of greater diameter than said first-named cylinder and a tapered portion uniting said cylinders, which consists in producing from sheet metal a half longitudinal section of a structurally integral series of said objects having like semi-cylindrical ends united, electrically welding two of said half sections together at their registering edges, and transversely dividing said united semi-cylindrical ends to separate the units of said series.

In testimony whereof I have affixed my signature in presence of two witnesses.

THOMAS E. MURRAY.

Witnesses:
GERTRUDE T. PORTER,
MAY T. MCGARRY.